(12) United States Patent
Mathison et al.

(10) Patent No.: US 7,715,169 B2
(45) Date of Patent: May 11, 2010

(54) FUEL RECEPTACLE ISOLATION SYSTEM FOR REDUCING THE POSSIBILITY OF STATIC DISCHARGE DURING THE REFILL OF HIGH PRESSURE STORAGE TANKS IN MOTOR VEHICLES

(76) Inventors: Steven R Mathison, Honda R&D Americas, Inc., 21001 State Rte. 739, Raymond, OH (US) 43067-9705; Shiro Matsuo, Honda R&D Americas, Inc., 21001 State Rte. 739, Raymond, OH (US) 43067-9705

( * ) Notice: Subject to any disclaimer, the term of this patent is extended or adjusted under 35 U.S.C. 154(b) by 787 days.

(21) Appl. No.: 11/302,059

(22) Filed: Dec. 13, 2005

(65) Prior Publication Data
US 2007/0044864 A1    Mar. 1, 2007

Related U.S. Application Data

(60) Provisional application No. 60/713,023, filed on Aug. 31, 2005.

(51) Int. Cl.
*H05F 3/00* (2006.01)
*B60C 19/08* (2006.01)

(52) U.S. Cl. .................. 361/215; 361/216; 361/217
(58) Field of Classification Search .......... 361/215, 361/216, 217
See application file for complete search history.

(56) References Cited

U.S. PATENT DOCUMENTS

| | | | | | |
|---|---|---|---|---|---|
| 3,391,817 | A | * | 7/1968 | Shaw | 220/246 |
| 3,557,993 | A | * | 1/1971 | DePew | 220/246 |
| 4,027,910 | A | * | 6/1977 | Farelli | 296/97.22 |
| 4,610,284 | A | * | 9/1986 | Bartholomew | 141/302 |
| 4,630,789 | A | * | 12/1986 | Rosenberg | 244/135 R |

FOREIGN PATENT DOCUMENTS

DE           30 27 002     *   2/1982

\* cited by examiner

*Primary Examiner*—Stephen W Jackson
*Assistant Examiner*—Zeev Kitov
(74) *Attorney, Agent, or Firm*—Mark E. Duell; Porter Wright Morris & Arthur, LLP.

(57) ABSTRACT

Apparatus for electrically isolating interconnecting station nozzle and vehicle receptacle components during the refueling of high pressure gas into a vehicle tank comprising an electrically isolated vehicle tank inlet receptacle engageable with a refueling nozzle wherein the receptacle includes an assembly of mutually engageable electrically insulating media in conjunction with the vehicle receptacle mount to prevent electrical contact from the refueling nozzle to the vehicle chassis and gas tank in the refueling gas flow conduit system.

20 Claims, 10 Drawing Sheets

FUEL RECEPTACLE ISOLATION SYSTEM FOR REDUCING THE POSSIBILITY OF STATIC DISCHARGE DURING THE REFILL OF HIGH PRESSURE STORAGE TANKS IN MOTOR VEHICLES

RELATED APPLICATIONS

This application claims the benefit of U.S. provisional application Ser. No. 60/713,023 filed on Aug. 31, 2005 which is incorporated herein by reference in its entirety.

FIELD OF THE INVENTION

The present invention relates to a system for eliminating the possibility of a static discharge during the refill of high pressure fuel storage tanks in hydrogen fuel cell powered vehicles.

BACKGROUND OF THE INVENTION

When hydrogen is used as a fuel in motor vehicles, a hydrogen fuel depot infrastructure for refueling must also be developed. Typically, present practice is that fuel is stored in on board tanks maintained at a maximum pressure in the range of about 5000 psi for hydrogen, and higher pressures in the range of about 10,000 psi or more are likely to be utilized in the future as the use of hydrogen becomes more widespread. During driving, a static charge may build up on the vehicle chassis. When the vehicle stops, the charge is usually dissipated to ground through the vehicle's tires; however, the rate of dissipation of the charge through the vehicle tires varies depending on the resistance of the tires and the resistance of the surface on which the vehicle is parked or stopped. If, at a refueling station or depot, the vehicle static charge energy is above a minimum threshold energy level that can cause the spark ignition of hydrogen gas, then it is unsafe to refuel the vehicle through the refill conduit connecting the fuel depot gas outlet and the vehicle tank inlet. If hydrogen were to leak at the depot refill nozzle or at the vehicle receptacle, a spark may occur when the refill nozzle is connected to the vehicle receptacle, which could potentially ignite the hydrogen. A conventional solution mitigates the static discharge problem, by manually connecting a grounding cable to the vehicle before refueling to avoid the potential for a spark to occur.

OBJECTS OF THE INVENTION

It is an object of the present invention to isolate any charge potential that could be present on the vehicle chassis from the refueling receptacle, and thus reduce the possibility of a static discharge during the refill of high pressure storage tanks in hydrogen fuel cell powered vehicles at a retail outlet fueling depot.

SUMMARY OF THE INVENTION

The invention is described more fully in the following description of the preferred embodiment considered in view of the drawings in which:

DETAILED DESCRIPTION OF THE INVENTION

The invention electrically isolates the refueling receptacle from the vehicle chassis. The electrically isolated receptacle is engageable with a refueling nozzle from the station depot side. The vehicle receptacle includes electrically insulating media to prevent electrical contact from the refueling nozzle to the vehicle chassis and gas tank. With reference to the description herein, the nozzle is an external fuel dispensing device that is connected to the receptacle; in describing the invention, "nozzle" refers to the station nozzle and the application should be so read contextually in the event of any ambiguity.

Figure 1A:
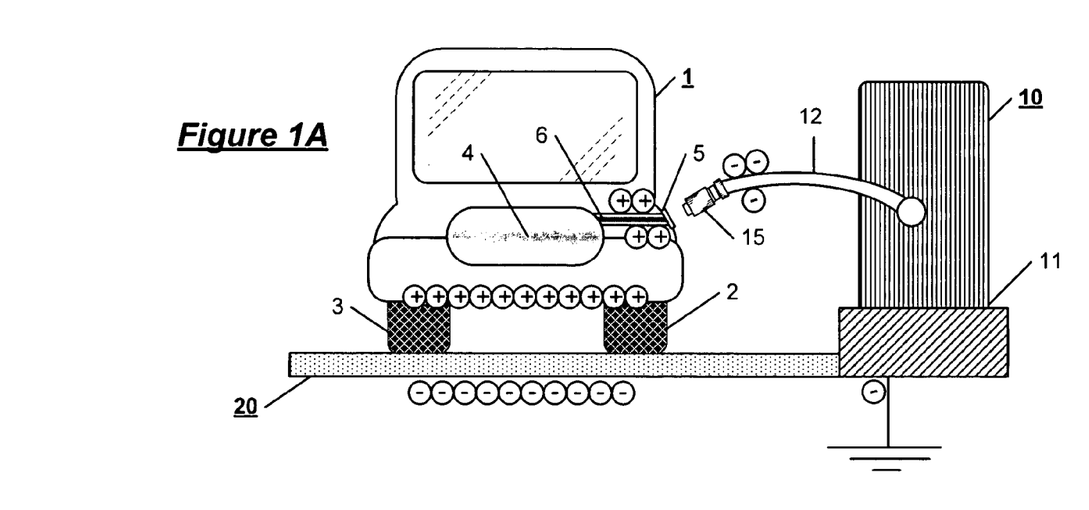
FIG. 1A is a diagram showing typical static potential between the vehicle, the fuel depot and ground at a refueling station.
Figure 1B:
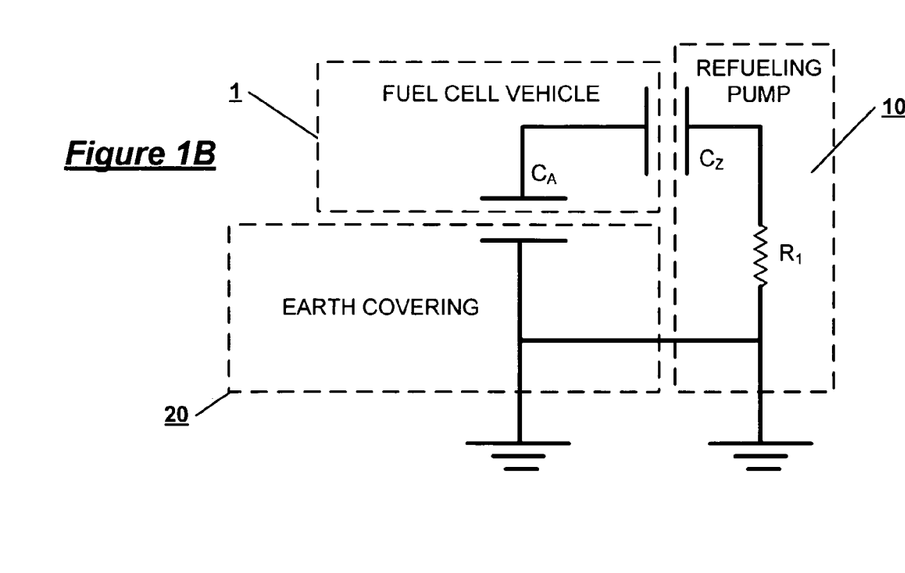
FIG. 1B is a schematic diagram showing the electrical resistance and capacitance of the vehicle, earth and refueling pump circuit equivalent to the representation of FIG. 1A.
Figure 1C:
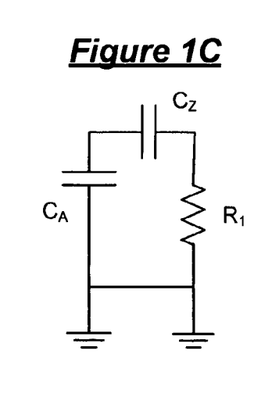
FIG. 1C is an electrical schematic diagram representing the circuit of FIG. 1B.

FIG. 1A depicts a typical static potential between the vehicle, the fuel depot and ground at a refueling station. In FIG. 1A, the rear of the vehicle is shown as 1 having right rear tire 2 and left rear tire 3. Hydrogen gas fuel tank 4 is interconnected through fuel conduit 6 to gas tank inlet 5. Ground [earth] is shown at 20. Refuel depot pump 10 is installed on base 11 and includes conduit 12 and nozzle 15 for interconnection with the fuel tank inlet 5. Electrical charges in the ambient vehicle/fuel depot environment are respectively shown as positive, +, and negative, −. FIG. 1B shows the electrical circuit equivalent wherein $C_A$ indicates capacitance between fuel cell vehicle 1 and earth 20 and $C_Z$ indicates capacitance between fuel cell vehicle 1 and refueling pump 10 and earth 20. $R_1$ indicates resistance between refueling pump 10 and ground or earth. As shown in FIG. 1A and FIG. 1B, a static charge builds up on the vehicle chassis during driving. When the vehicle stops, the rate of dissipation of the charge through the vehicle tires varies depending on the resistance of the tires and the resistance of the surface on which the vehicle is parked or stopped. If, at a refueling station or depot, the vehicle static charge potential stored in the capacitor elements, $C_A$ and $C_Z$ of the circuit is above a minimum threshold energy level exceeding the limit of $R_1$, a spark may occur that can cause the ignition of hydrogen gas. See FIG. 1C.

Example A

Figure 2:
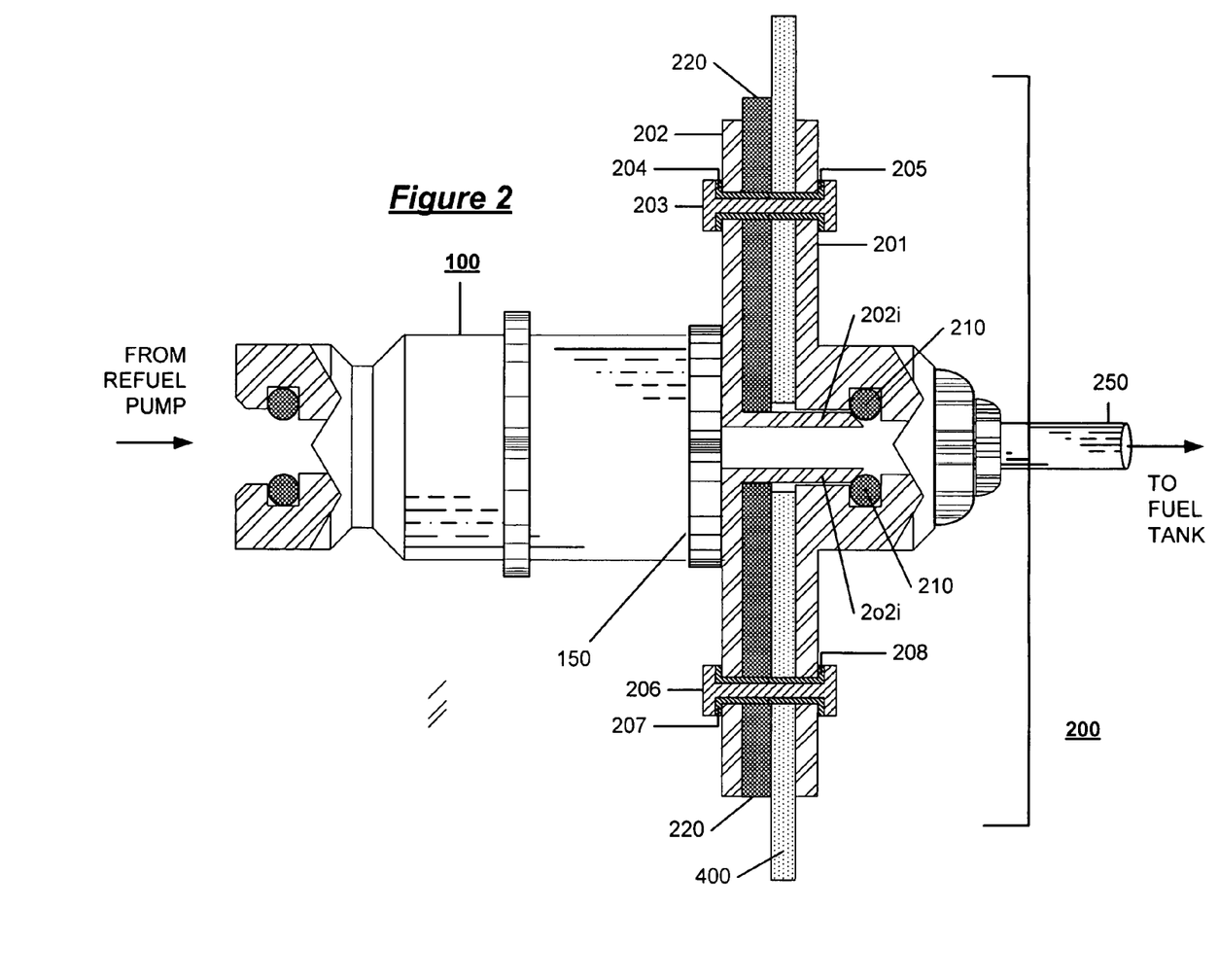
FIG. 2 shows a cross section side view demonstrating the principles of the insulating properties of the invention showing a vehicle fuel refilling receptacle with reference to the vehicle tank inlet on a hydrogen powered vehicle.

FIG. 2 is a longitudinal side cross section view of an embodiment of the invention showing the exterior side of the vehicle receptacle (that joins with the station nozzle) 100 and the vehicle receptacle assembly 200 through which the fuel conduit is joined to the vehicle's hydrogen storage tanks in accordance with the invention. In the drawings of the FIG. 2 and FIG. 3 series shown, a frontal lateral cross section of the cylindrical elements involved is evident from the side views depicted and their respective explanations. Fuel depot receptacle connector 100 is conventional and includes interlocking means (not shown) to securely engage the pump nozzle with the fuel inlet of the vehicle tank. The interior side of the vehicle receptacle 200 leads from the receptacle through a conduit 250 to the vehicle fuel storage tank (not shown). The vehicle receptacle 200 is electrically isolated from both the vehicle body 400 and the fuel tank system 250. The receptacle comprises vehicle body interior section 201 and mating vehicle body exterior section having integral interior extending element 202i sandwiching the section of the vehicle body 400 upon which the receptacle is mounted. Receptacle mating elements, element 201, and element 202, are affixed to the vehicle body by a plurality of fasteners insulated from contact with the vehicle body. As shown in the cross section, fastener 203 is insulated by grommets 204 and 205; fastener 206 is insulated by grommets 207 and 208. A gasket or laminate layer of insulating material 220 at least coextensive with the facing receptacle elements is also secured by the fasteners and insulates the receptacle surface from the vehicle body. Insulating o-ring or gasket 210 prevents contact of any extending stem portion, alternatively of either of the station nozzle or the vehicle receptacle exterior section, and/or both, with the interior portion of the vehicle tank receptacle 201. In this manner, the flow path of fuel in the station conduit from the nozzle 100 to the conduit for the vehicle tank system 250 is electrically insulated from the vehicle body and vehicle tank system.

In Example A, a vehicle fuel receptacle is isolated from a vehicle body and tank system while allowing a secure conduit for high pressure fuel gas flow from the nozzle to the tank. An exterior vehicle tank inlet receptacle is engageable with the refueling nozzle; the receptacle has a vehicle body interior flange and a mating vehicle body exterior flange with a cylindrical extending section concentric with the interior flange leading to the fuel tank. The receptacle flanges are disposed to and fasten the section of the vehicle body upon which the receptacle is mounted; an insulating gasket is essentially coextensive with the exterior flange and the vehicle body. Concentrically extending sections of the flanges and gasket are secured with respect to the vehicle body by electrically non-conducting fasteners, or equivalently, by electrically conductive fasteners insulated from the flanges and vehicle body by insulating grommets. An o-ring may be disposed within the interior extending section of the interior flange adjacent the end of the concentric section of the exterior flange that extends within the interior flange. In an example, an insulating sleeve is disposed around the outer surface of the extending interior section of the exterior flange; the sleeve may extend beyond the end of the extending interior section of the exterior flange and fold inwardly at the end thereof to enhance insulating qualities.

In embodiments, a recessed o-ring is disposed within the interior extending section of the interior flange between the sleeve and the extending section of the interior flange or a pair of recessed o-rings, a first o-ring disposed within the interior extending section of the interior flange, and a second o-ring disposed within the interior extending section of the exterior flange, may be disposed within the flange sections such that the o-rings sandwich the sleeve. Based on design factors, one o-ring may be formed from a metal and the second o-ring may be formed from an electrically insulating material. The sleeve for the extending section of the exterior flange may be a cylindrical metallic collar having interior and outer surfaces covered with an electrical insulator and the insulator may comprises a surface coating of a polymeric material. O-rings may be longitudinally offset from, or aligned with, one another. The gaskets and insulator materials are preferably a nylon as described below.

The object of the invention is to isolate and minimize any electrical charge that could be present on the vehicle chassis and prevent the creation of a spark when the station nozzle is connected to the vehicle receptacle. Because the station nozzle is electrically grounded, if the receptacle on the vehicle is directly connected to the vehicle chassis, and the chassis still holds a static electrical charge, a spark can occur across the air gap as the nozzle approaches the receptacle while connecting the two during the refueling process. This spark could potentially ignite a hydrogen/air mixture that could be present due to a leak or other factors in the nozzle or receptacle areas. Normally the vehicle is grounded via a grounding cable or thru the vehicle tires before the nozzle is connected to the receptacle. However, the user may forget to or purposely avoid connecting the grounding cable prior to connecting the nozzle, or the fueling pad surface may have too high a resistance to adequately ground through the tires. When the receptacle is electrically isolated from the vehicle chassis, then there is little or no possibility for the electrical charge on the vehicle chassis to gap across to the nozzle and create a spark that may potentially ignite the hydrogen. The invention thus creates a safer refueling environment for the user and can be utilized as a secondary layer of protection in case the primary protection, dissipation of static electrical charge via grounding to earth, fails. In the discussion of the embodiments, reference numerals for elements of the vehicle receptacle and the fuel station connector to the receptacle that are initially identified in prior drawings may be omitted, both to avoid redundancy and for purposes of clarity in explaining the invention; however, their presence is evident in context.

Figure 2A:
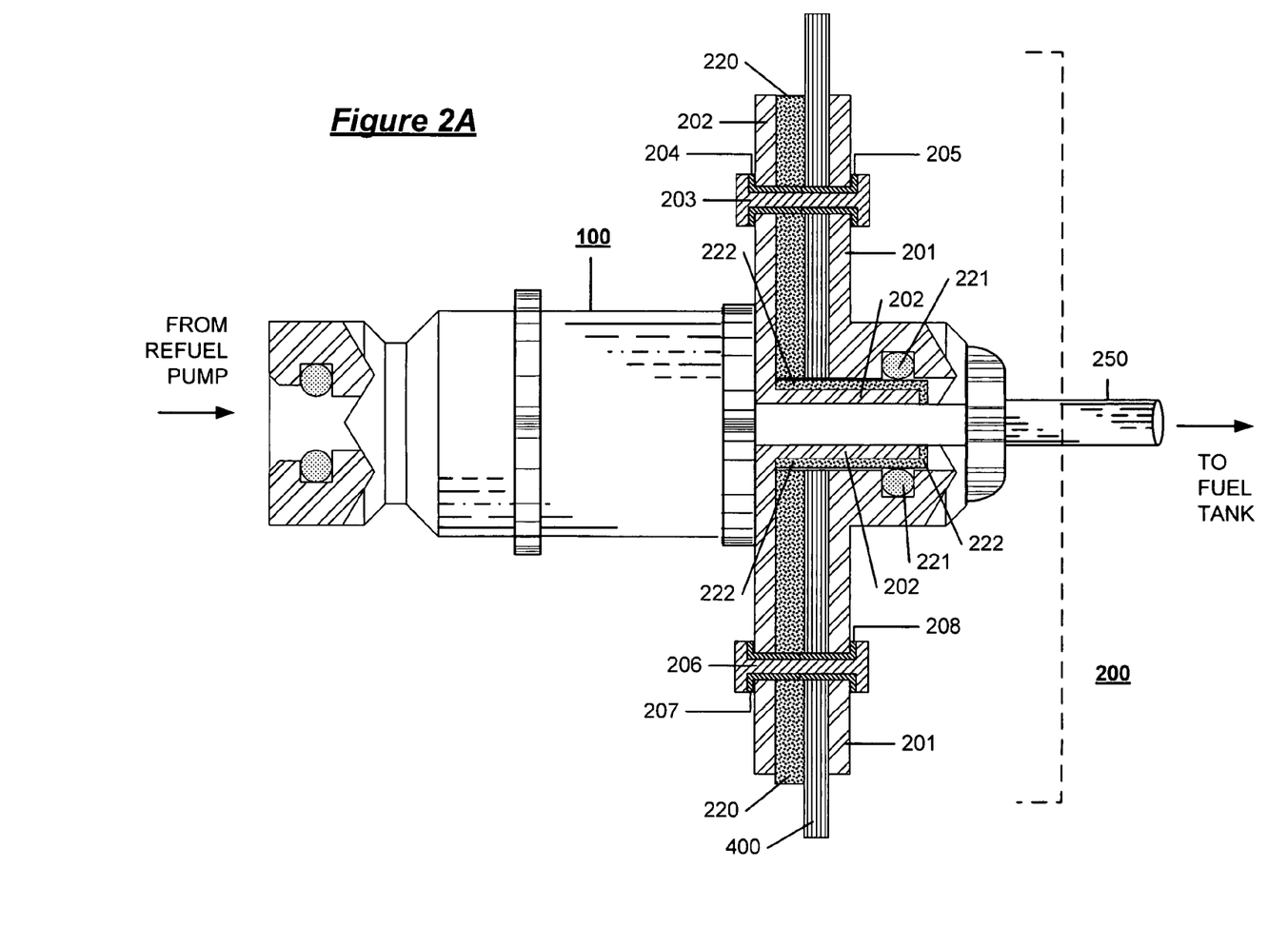
FIG. 2A, FIG. 2B, FIG. 2C, FIG. 2D and FIG. 2E depict cross section side views of embodiments of the invention.

FIG. 2A shows an embodiment in which a high strength engineering plastic material with good durability and electrical isolation properties, such as a nylon electrical insulating material, is molded into a shape 222 that fits around and/or is bonded to the outer surface of the conductive inner sleeve section 202 of the outer part of the receptacle. Insulating o-ring 221 is shown. As used herein, "nylon" refers to the synthetic polymer engineering material, nylon, and other suitable, or equivalent, high strength engineering plastic materials with electrical isolation properties, such high performance polyamides and other polymeric electrical insulating materials having properties of toughness, durability and wear resistance, with mechanical performance characteristics over a wide temperature range suitable for use in high pressure fuel delivery systems for automotive applications.

Figure 2B:
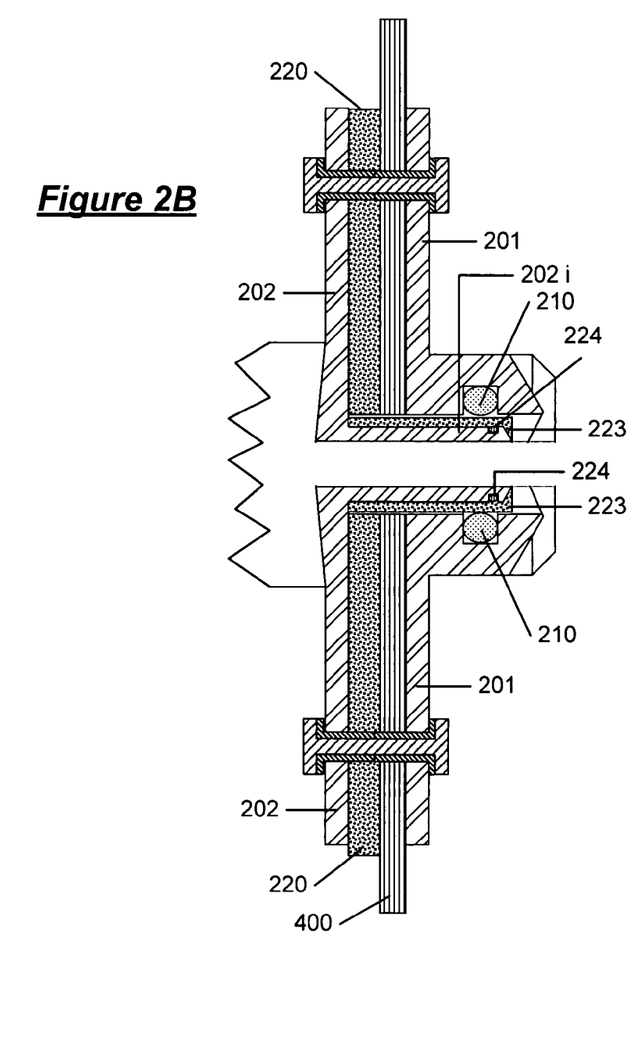

An embodiment is shown in FIG. 2B, wherein a nylon engineering plastic material, is molded into a shape 223 that fits around and/or is bonded to the outer surface of the inner sleeve section 202 of the outer part of the vehicle receptacle. Shape 223 provides an insulating mechanism sealed on the inner surface and which is secondarily sealed in the assembly by an o-ring 224 interposed between the extending segment of the receptacle section 202 and the nylon insulating shape 223. Assembly o-ring 210 is also shown.

Figure 2C:
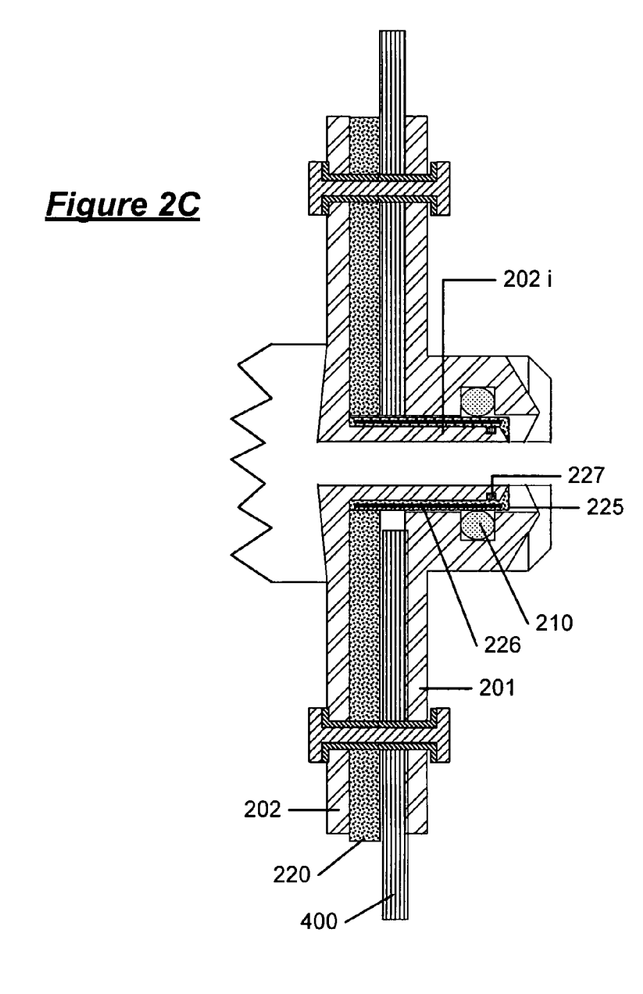

FIG. 2C shows an embodiment wherein the nylon electrically insulating engineering plastic material 225 is molded around a tubular metal collar 226 to form an insulating sleeve, which is then bonded to the inner male receptacle section 202i of the outer part 202 of the vehicle receptacle. The collar includes a folded over extending end section proximate the terminal end of receptacle section 202i. Primary sealing occurs on the inner surface by bonding of the inner surface of the collar 226 to section 202i; secondary sealing results from pressures exerted by insulating o-ring 210 in part 201 and metallic o-ring 227 recessed in section 202i. The polymeric insulating o-rings and gaskets shown include elements formed from nylon and other high strength engineering plastic materials having properties of toughness, durability, wear resistance, and mechanical performance over a wide temperature range, suitable for use in high pressure fuel delivery systems in automotive applications.

Figure 2D:
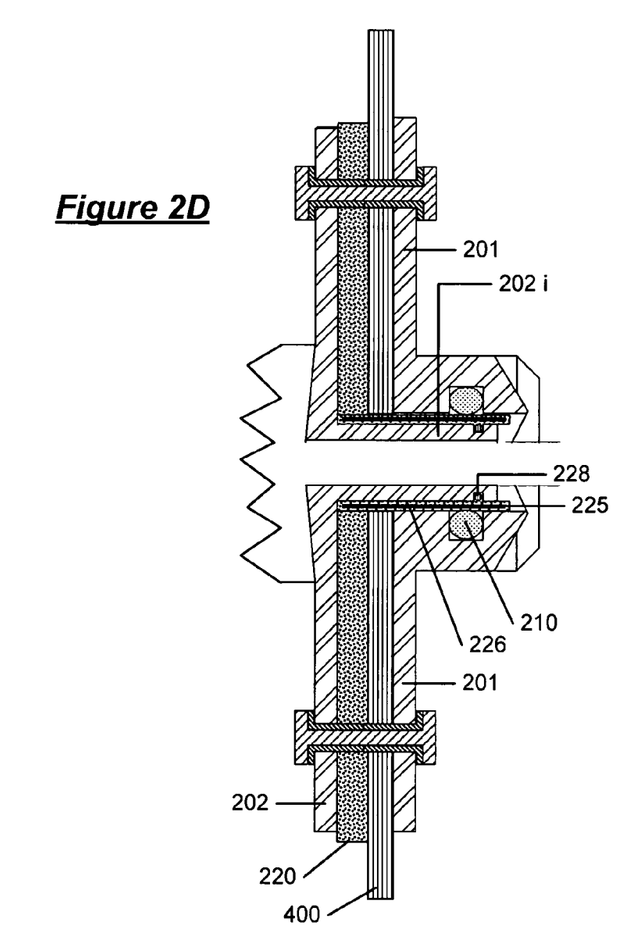

FIG. 2D shows an embodiment wherein the electrically insulating nylon material 225 is molded around a metal collar 226 to form an insulating sleeve, which slides over and correspondingly engages the inner male receptacle sleeve section 202i of the outer part of the vehicle receptacle, extending beyond the terminal end thereof. Gas sealing occurs on the sandwich disposition of the insulator, namely collar 226 surrounded by plastic 225 between insulating o-ring 210 recessed in section 201 supplemental o-ring 228 recessed in section 202i.

Figure 2E:
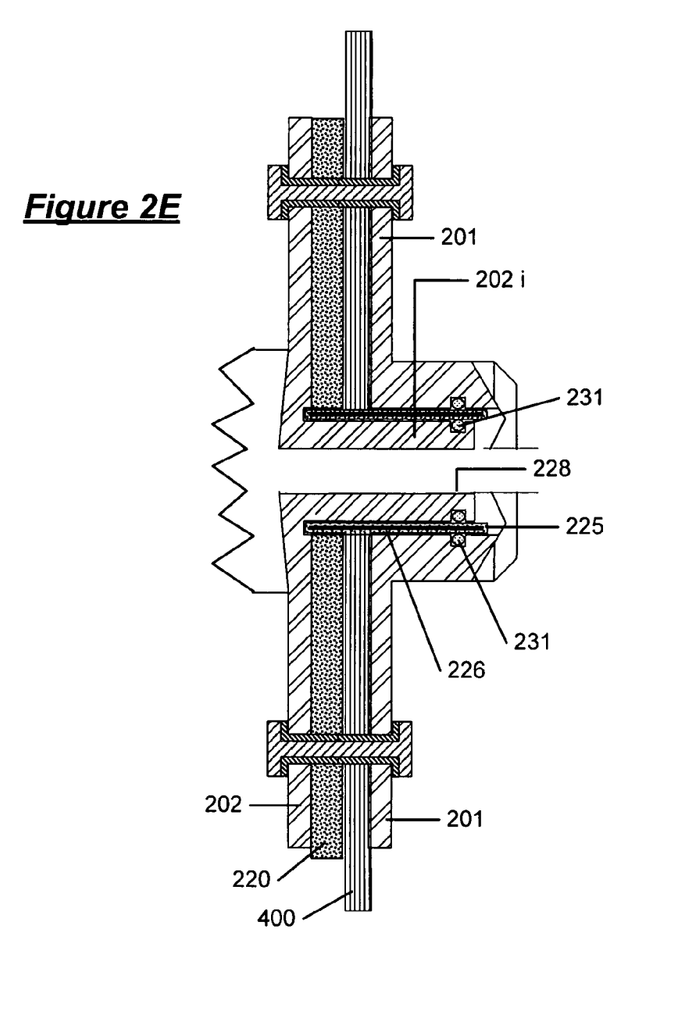

FIG. 2E shows an embodiment wherein the electrically insulating engineering plastic material 225 is molded around a metal collar 226 to form an insulating sleeve, which slides over and engages with the inner male receptacle sleeve section 202 of the outer part of the vehicle receptacle. Gas sealing occurs as a result of circular forces generated by the sandwich disposition of the insulator, namely collar 226 surrounded by insulating plastic coating 225, between o-ring 231 recessed in section 202i and o-ring 232 recessed in section 201.

Example B

Figure 3:
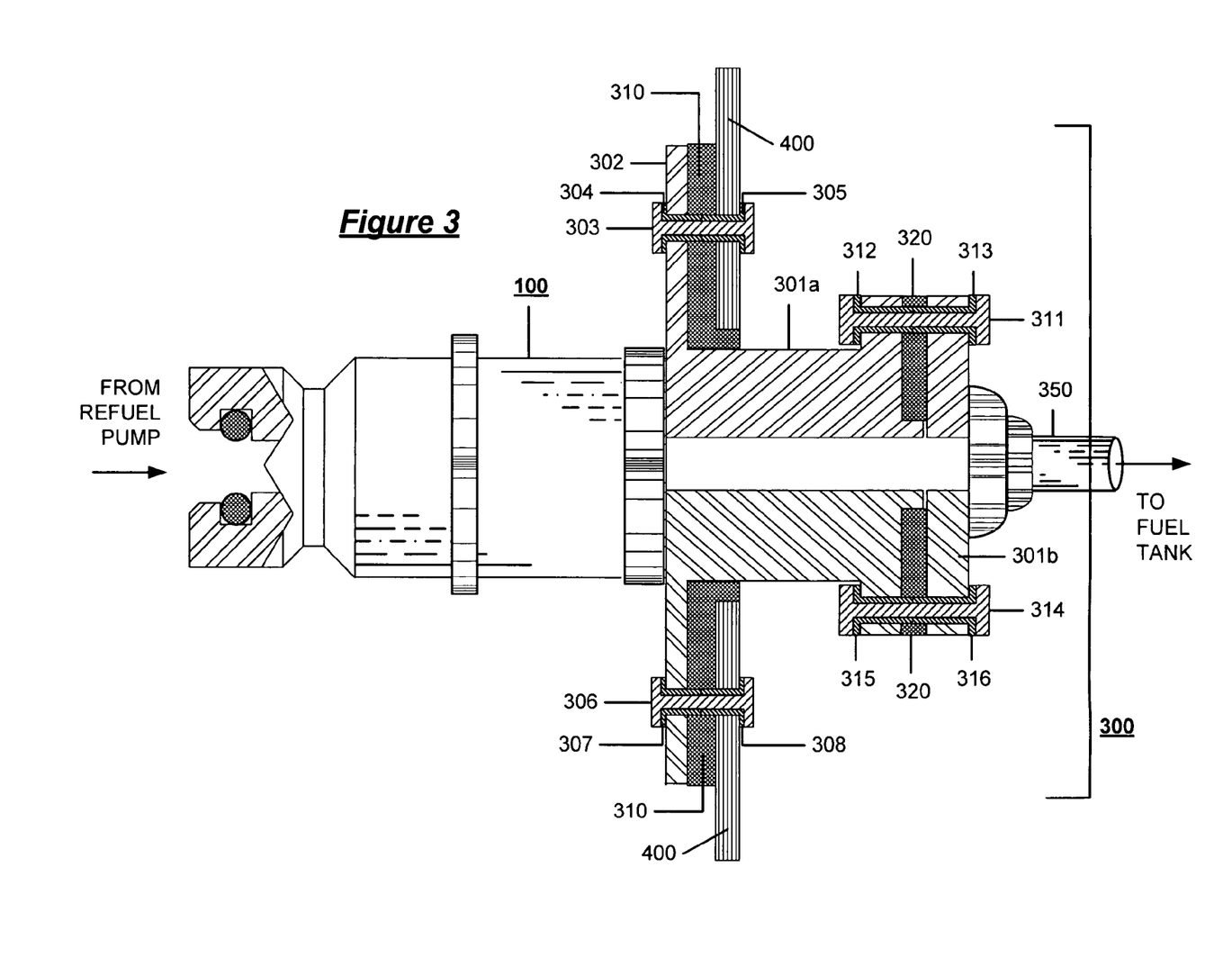
FIG. 3 is a cross section side view of an alternative configuration of a vehicle fuel receptacle applying the insulating principles of the invention.

FIG. 3 is a side cross section view of another embodiment of the invention using a series of collinearly aligned gaskets and receptacle elements insulating the vehicle fuel receptacle from the vehicle body. In FIG. 3 the exterior side of the receptacle that joins with the station nozzle 100 and the interior side of the receptacle 300 which is joined to the vehicle's hydrogen storage tank system in accordance with the invention are shown. Fuel nozzle receptacle 100 is conventional and includes interlocking means (not shown) to securely engage the pump nozzle with the fuel inlet of the vehicle tank. The interior side of the vehicle receptacle 300 leads from the nozzle through a conduit 350 to the vehicle fuel storage tank (not shown). The vehicle nozzle 100 is electrically isolated from both the vehicle body 400 and the fuel tank conduit system 350. The receptacle comprises collinearly aligned elements 301a, which includes a flange section 302 for securing the receptacle to the vehicle exterior body panel 400. Separating flange 302 from the vehicle body 400 is an insulating gasket 310. The flange 302 and gasket insulator 310 are fastened to the vehicle body by one or more fasteners such as 303, insulated from the vehicle body and receptacle by grommets 304 and 305, and 306, insulated from the vehicle body and receptacle by grommets 307 and 308. Exterior receptacle component 302 includes elements 301a and 301b separated from each other and insulated from each other by electrically insulating gasket 320 maintained in a fixed alignment by fasteners such as fastener 311, insulated from section 301a and section 301b, and fastener 314, insulated from section 301a and section 301b by grommets 315 and 316. In this manner, insulator 310 (held in place by the insulated fasteners) electrically isolates the vehicle body 400 from section 301a of the receptacle and insulator 320 (held in place by the insulated fasteners) electrically isolates the vehicle receptacle nozzle 100 from the vehicle tank system 250. Fuel thus flows from the nozzle into the vehicle tank through an electrically isolated pathway 350 from the fuel pump to the vehicle tank.

In this example, the receptacle comprises a vehicle body flange having an exterior flange section disposed with respect to the vehicle body and an interior section extending from the exterior section toward the vehicle body interior. An insulating gasket is disposed between the exterior flange and the vehicle body in a sandwich relationship and a terminal is plate affixed to the interior extending end section of the vehicle body flange insulated by a gasket disposed between the end section of the vehicle body flange and the terminal plate. As in the above example, the flange, gaskets and plate are collinearly concentrically aligned such that an unobstructed fuel conduit is provided for high pressure hydrogen gas (or compressed natural gas). The exterior flange is insulated from the vehicle body by a flange in the gasket providing a central collar section extending over the inward extending section of the exterior flange from the vehicle body exterior. Fasteners securing the assembly, electrically insulate the receptacle from the vehicle body. In the embodiment shown, the plate gasket comprises a metal washer coated with an electrically insulating material and the plate gasket may be disposed between the aligned or offset o-rings. A reverse flange may be intrinsically formed at the interior facing end of the extending section of the exterior flange to receive a fastener for securing the plate with the insulator therebetween.

Figure 3A:
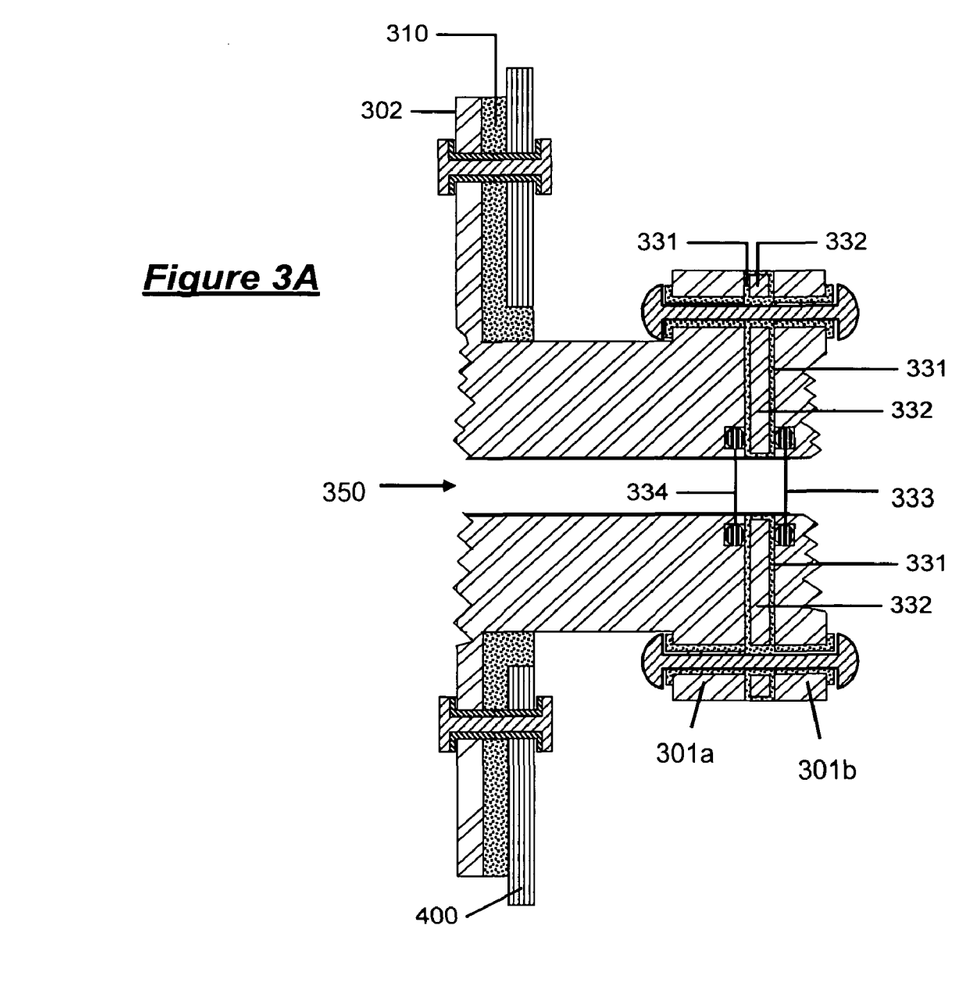
FIG. 3A and FIG. 3B are cross section side views of further embodiments of the alternate configuration of the invention shown in FIG. 3.

In FIG. 3A, a nylon wrapping collar or sleeve 331 is molded around a disk 332, which may be formed as a steel washer, that serves as structural support for high stresses in the filling system, and the gas sealing occurs by o-ring 333 recessed in the inner section 301b of the receptacle and o-ring 334 recessed in the outer section 301a of the receptacle.

Figure 3B:
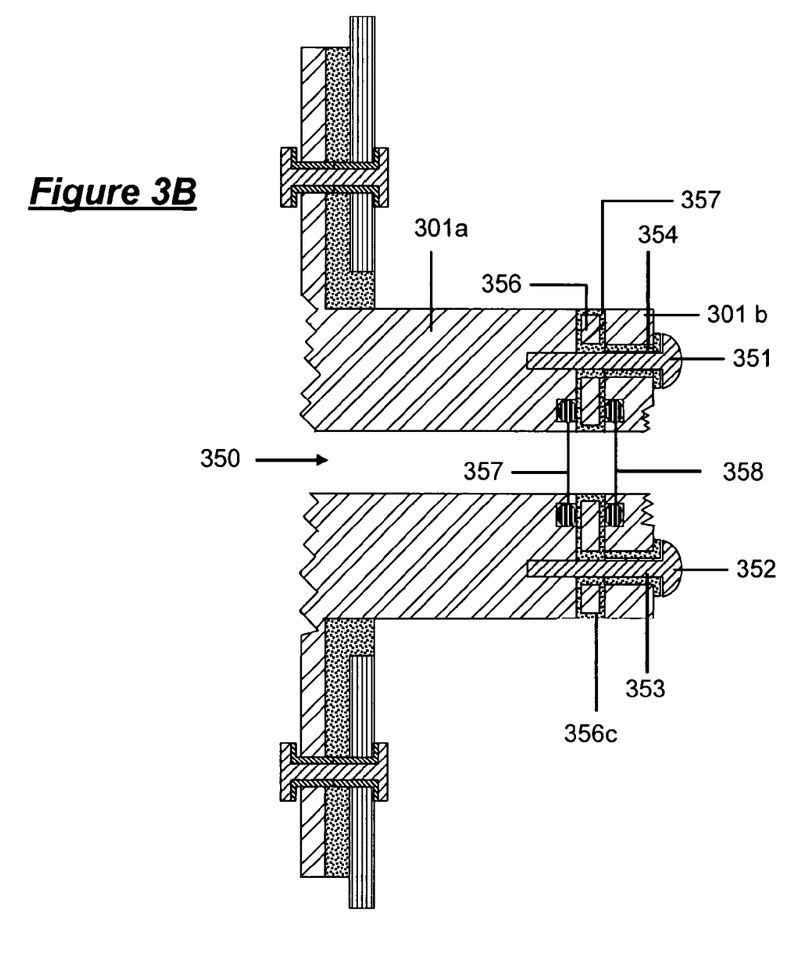

In FIG. 3B, an assembly is shown in which bolt 351 insulated by nylon grommet 353 and bolt 352 insulated by nylon grommet 351 and 354 secures cap 301b securely in position with the extending part 301a of the interior flange. Between cap 301 and flange element 301b, an insulating washer 356 is provided. The washer comprises a high strength engineering nylon molded around a central steel disk that serves as structural support for high stresses. Central metal element 356 is coated or molded with insulating material 356c. O-rings 356 and 357 recessed respectively in the facing ends of sections 301a and 301b provide the gas sealing.

The mechanism of the invention thus isolates electrical charge that is possibly present on the vehicle chassis that could create a spark when the station nozzle is connected to the vehicle receptacle. The possibility is reduced that a spark could potentially ignite a hydrogen/air mixture that might occur due to a leak in the nozzle or receptacle areas. When the receptacle is electrically isolated from the vehicle chassis, the possibility for the electrical charge on the vehicle chassis to gap across to the nozzle and create a spark resulting in the potential ignition of hydrogen is reduced. The invention thus creates a safer refueling environment for the user and can be utilized as a secondary layer of protection in the event that the primary protection—dissipation of static electrical charge via grounding to earth—fails.

Having described the invention in detail, those skilled in the art will appreciate that, given the present description, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. A gas inlet receptacle for an on board high pressure fuel gas tank engageable with a refueling nozzle directing gas flow to the tank for electrically isolating a vehicle's high pressure fuel gas receiving system from the vehicle's body and the vehicle's fuel tank;

the receptacle comprising:

a) a first flange collar exterior to the vehicle body having a cylindrical section extending intrinsically from the first flange collar through an opening in the vehicle body toward the vehicle interior, the cylindrical section adapted such that the cylindrical section is not in contact either with the vehicle body or a second flange into which the cylindrical section is coaxially inserted and such that the cylindrical section terminates before an end of a second cylindrical section of the second flange;

b) the second flange interior to the vehicle body, concentrically aligned with the cylindrical section of the first flange, having a second cylindrical section intrinsically extending toward the vehicle interior, and adapted, on the exterior facing side, to receive the cylindrical section extending from the first flange such that a portion of the first flange cylindrical section is within an interior section of the second cylindrical section, and adapted, on the interior facing side, to connect with a fuel conduit to the vehicle storage tank or tanks;

c) an electrically insulating gasket exterior to the vehicle body surrounding the opening in the vehicle body and disposed between the first flange collar of and the vehicle body;

d) a plurality of electrically neutral fasteners disposed around the flange collar penetrating through the flange collar, the gasket, the vehicle body, and the second flange to secure the receptacle to the body;

e) an electrically insulating o-ring disposed within a groove in the second cylindrical section extending from the second flange at a location before a terminal end of the second cylindrical section and located at the terminal end of the cylindrical section of the first flange that extends into the second flange cylindrical section; and f) extending from the interior of the receptacle, a conduit from the terminal end of the second cylindrical section of the second flange for directing gas flow introduced from the nozzle to the cylindrical section of the first flange to the vehicle storage tank or tanks;

whereby the flow path of fuel from the nozzle to the conduit for the vehicle tank is electrically insulated from the vehicle body and vehicle tank when the nozzle is engaged with the receptacle.

2. The receptacle of claim 1 wherein the electrically insulating gasket is a polymeric material having properties of toughness, durability and wear resistance in a high pressure environment.

3. The receptacle of claim 2 wherein the polymeric material is nylon.

4. A high pressure fuel gas inlet receptacle for an on board vehicle fuel tank engageable with a refueling nozzle for electrically isolating a vehicle high pressure fuel gas receiving system from a vehicle body and tank while the tank is being refueled;

the receptacle comprising:

a) a first flange collar exterior to the vehicle body having a cylindrical stem extending intrinsically from the collar through the vehicle body, the stem having an electrical insulating cover shaped such that that the cover surrounds the outer surface of the stem and the front face opening of the terminal end of the stem extending within the vehicle body;

b) a second flange interior to the vehicle body aligned with the first flange and having a cylindrical section intrinsically extending toward the vehicle interior, and adapted, on the interior facing side, to mate with the cover surrounding the stem extending from the first flange, and adapted, on the interior facing side, to connect with a fuel conduit leading to the vehicle storage tank or tanks;

c) an electrically insulating gasket disposed between the facing surfaces of the collar of the first flange and the vehicle body;

d) a plurality of electrically insulating fasteners disposed around the flange collars penetrating through the first flange, the vehicle body, the gasket, and the second flange to affix the receptacle to the body; and e) an electrically insulating o-ring disposed within a groove in the section extending from the second flange at a location before the terminal end of the section and mating with the cover surrounding the exterior of the stem on the first flange; and wherein extending from the receptacle, a conduit from the terminal end of the second flange directs the high pressure gas flow from the nozzle to the vehicle storage tank or tanks; and the flow path of fuel from the nozzle to the conduit for the vehicle tank is electrically insulated from the vehicle body and vehicle tank when the nozzle is engaged with the receptacle.

5. The receptacle of claim 4 wherein the cover surrounding the stem is bonded to the outer surface of the stem.

6. The receptacle of claim 4 wherein the cover surrounding the stem is a sleeve sliding over the outer surface of the stem and engageable therewith when the receptacle is affixed to the vehicle.

7. The receptacle of claim 5 wherein the gasket, the cover and the o-ring are formed from a polymeric material having properties of toughness, durability and wear resistance in a high pressure environment.

8. The receptacle of claim 7 wherein the polymeric material is nylon.

9. A high pressure gas inlet receptacle engageable with a refueling nozzle for electrically isolating an on board vehicle fuel tank for a high pressure fuel gas receiving system from a vehicle body and the on board tank;

the receptacle comprising a) a first flange collar exterior to the vehicle body having a cylindrical stem extending intrinsically from the collar through the vehicle body, the cylindrical stem having an electrical insulating cover shaped such that that the cover surrounds the outer surface of the stem and the front face opening of the cylindrical stem;

b) a second flange interior to the vehicle body concentrically aligned with the first flange and having a cylindrical section intrinsically extending toward the vehicle interior, and adapted, on the exterior facing side, to receive the covered stem extending from the first flange, and adapted, on the interior facing side, to connect with a fuel conduit directing the flow of gas to the vehicle storage tank or tanks;

c) an electrically insulating gasket disposed between the collar of the first flange and the vehicle body;

d) a plurality of electrically insulating fasteners circumferentially disposed around the first flange collar, the vehicle body and the second flange collar mutually aligned to affix the receptacle to the body;

e) a first electrically insulating o-ring disposed within a groove in the interior of the cylindrical section extending from the second flange at a location before the terminal end of the section and mating with the covered stem at a position before the terminal end of the covered stem; and f) a second o-ring disposed within a groove in the interior of the extending section of the first flange offset from the first o-ring and mating with the stem covering at a location in the first flange before the terminal end of the stem and after the center diameter of the o-ring mounted in the second flange section; wherein extending from the receptacle, a conduit from the terminal end of the second flange directs gas flow from the nozzle to the vehicle storage tank or tanks; and the flow path of high pressure fuel from the nozzle to the conduit for the vehicle tank is electrically insulated from the vehicle body and vehicle tank when the nozzle is engaged with the receptacle while the tank is being refueled.

10. The vehicle tank inlet receptacle of claim 9 wherein the electrical insulating cover for the cylindrical section of the first flange comprises an electrically insulating material that is molded around a tubular metal collar and the insulated collar is bonded to the stem of the first flange.

11. The receptacle of claim 9 or claim 10 wherein the cover surrounding the stem of the first flange is bonded to the outer surface of the stem.

12. The receptacle of claim 9 wherein the cover surrounding the stem of the first flange is a sleeve surrounding the outer surface of the stem.

13. The receptacle of claim 9 wherein the cover, the gasket, and the o-rings are formed from a polymeric material having properties of toughness, durability and wear resistance in a high pressure environment.

14. The receptacle of claim 13 wherein the polymeric material is nylon.

15. The receptacle of claim 1 comprising an electrically insulating cover applied over each fastener, the cover preventing conductive contact of the fasteners and the first flange collar, the vehicle body, and the second flange collar.

16. The receptacle of claim 4 comprising an electrically insulating cover applied over each fastener, the cover preventing conductive contact of the fasteners and the first flange collar, the vehicle body, and the second flange collar.

17. The receptacle of claim 9 comprising an electrically insulating cover applied over each fastener, the cover preventing conductive contact of the fasteners and the first flange collar, the vehicle body, and the second flange collar.

18. The receptacle of claim 4 wherein an electrically insulating o-ring is disposed within a groove in the section extending from the second flange at a location before the terminal end of the section and corresponding to the terminal end of the first flange section that extends into the second flange.

19. The receptacle of claim 1 or claim 4 or claim 9 wherein the stem is inserted through the opening in the vehicle body and the opening has a diameter larger than the stem such that the vehicle body opening is not in contact with the stem.

20. The receptacle of claim 1 or claim 4 or claim 9 wherein the gasket between the first flange collar and the vehicle body includes an opening greater than the external diameter of the stem such that the vehicle body opening is not in contact with the stem.

* * * * *